Jan. 31, 1967   C. E. PLYMALE   3,301,933
ELASTIC MELT EXTRUDER
Filed May 17, 1963   2 Sheets-Sheet 1
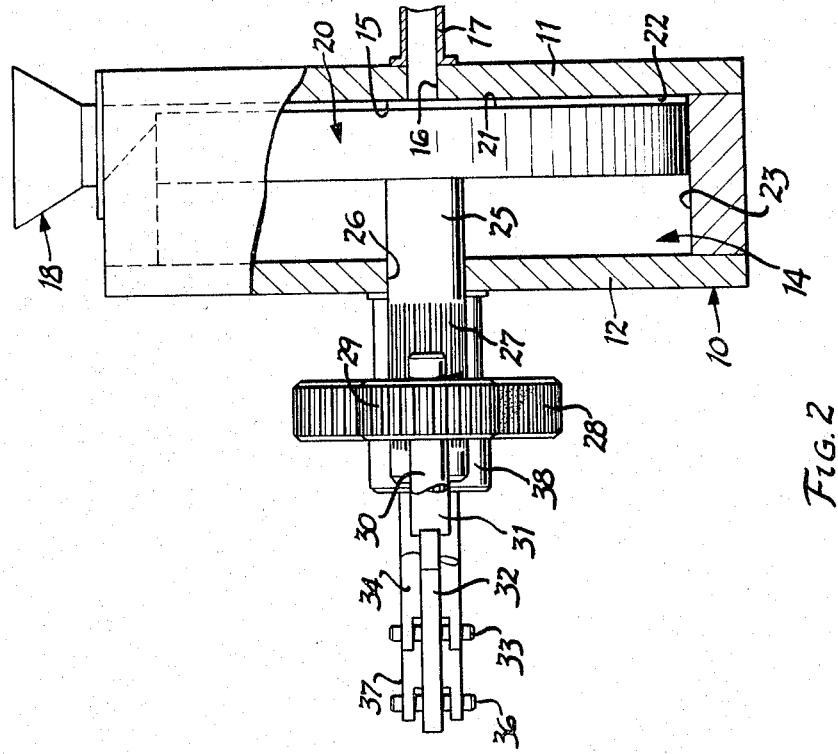
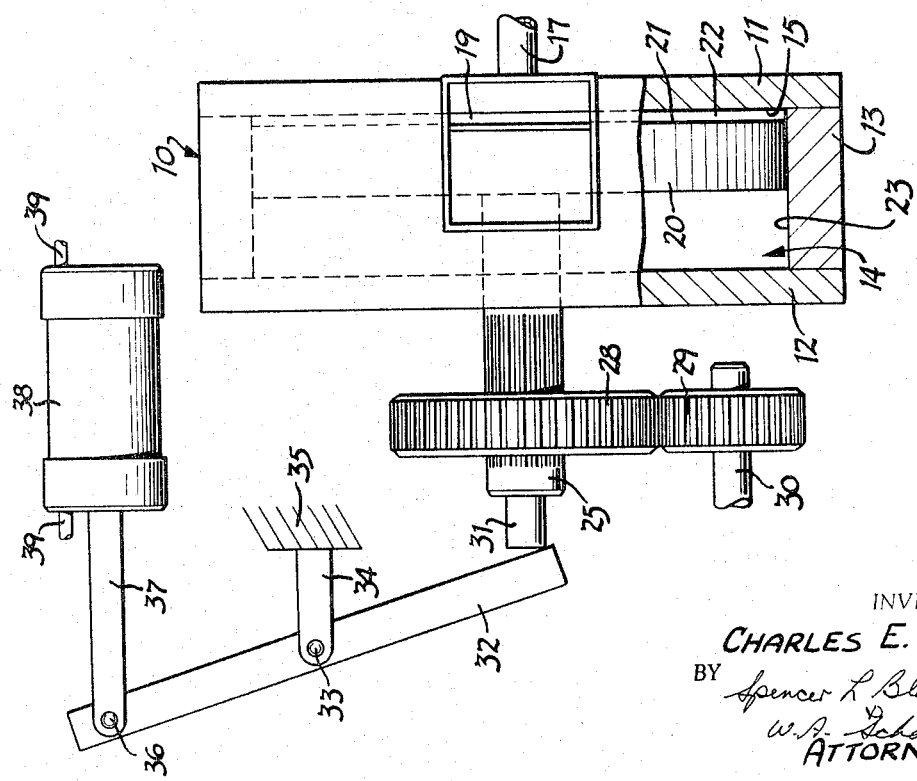
INVENTOR.
CHARLES E. PLYMALE
BY Spencer L. Blaylock
W. A. Schach
ATTORNEYS

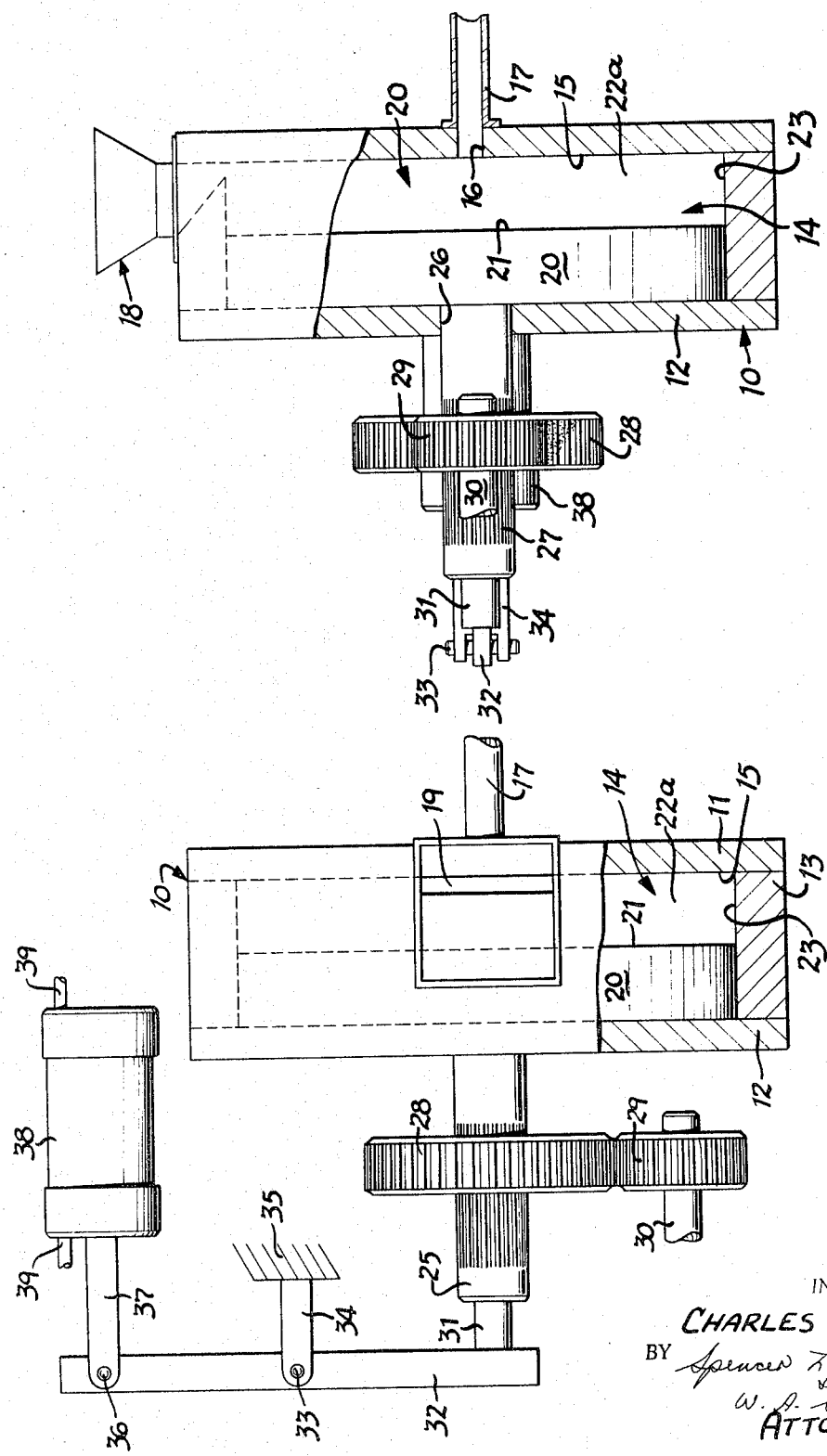

United States Patent Office 3,301,933
Patented Jan. 31, 1967

1

3,301,933
ELASTIC MELT EXTRUDER
Charles E. Plymale, Maumee, Ohio, assignor to Owens-Illinois, Inc., a corporation of Ohio
Filed May 17, 1963, Ser. No. 281,172
7 Claims. (Cl. 264—176)

The present invention relates to an elastic melt extruder and to a method of operating such an extruder. More particularly, this invention relates to an elastic melt extruder capable of intermittently issuing extrudate and capable of accumulating plasticized material intermediate such issues of extrudate.

There has been recently developed a new type of plasticizer-extruder, commonly known as an "elastic melt extruder" utilizing "the normal force effect," i.e. the normal force developed when a visco-elastic material is sheared between a rotating plate and a stationary plate, to perform the functions of a conventional plasticizer-extruder. Such an elastic melt extruder is described in detail in "Modern Plastics Magazine" of October 1959, at page 107, in an article by Bryce Maxwell and Anthony J. Scalora.

An elastic melt extruder typically utilizes a power-driven, rotatable disc operable within a convolute chamber to which solid plastic material is furnished from a supply hopper or the like. A radial face of the disc is spaced through a narrow gap from a corresponding face of an orifice plate having an exit orifice axially aligned with the disc. As the disc is rotated, the thermoplastic material introduced peripherally of the disc and confined between the radial shearing faces of the disc and the orifice plate is subjected to shearing forces. The thermoplastic material is essentially elastic, and the tendency of the sheared material for elastic recovery after arcuate shearing and stretching between the radial faces effects centripetal flow of material between the disc and the orifice plate toward the central orifice, the material issuing from the orifice in plasticized condition at a predetermined pressure.

The conventional elastic melt extruder as above described is inherently a continuously operating device from which extrudate issues continuously, so long as solid plastic material is supplied to the shearing zone. The size of the shearing zone, i.e. the gap between the shearing faces, is critical, this gap typically ranging from about $\frac{1}{16}$ of an inch to less than about $\frac{1}{2}$ of an inch, since the visco-elastic effect must be exerted upon a relatively thin layer of material interposed between the two faces.

In the past, the utilization of such conventional elastic melt extruders has been severely limited by the necessity for continuously issuing the plasticized material through the outlet orifice, such extruders normally having a single operating condition at which the output of the plasticizer-extruder is fixed, due to the fixed size of the relatively rotating faces and the fixed size of the gap necessary to exert the visco-elastic effect.

The present invention now provides a new and improved elastic melt extruder of increased flexibility in use and capable of intermittently issuing plasticized material and of storing plasticized material for future issuance. In the normal or conventional elastic melt extruder, relative rotation of the discs at the fixed gap necessarily required a continuous issuance of plasticized material, the pressure drop caused by the restricted orifice through which the material is issued being less than the output pressure generated in the material by the visco-elastic effect exerted at the gap.

The present invention, in essence, varies the gap between the two relatively rotatable elements between a first, effective gap at which the visco-elastic effect is exerted on the material to extrude plasticized material through the outlet orifice due to the fact that the pressure generated within the gap is greater than the pressure drop effected at the orifice, and a second, larger gap at which the pressure generated therein by the visco-elastic effect is less than the pressure drop because of the presence of the outlet orifice, thus no material is issued from the outlet orifice even though the relatively rotatable members continue to be rotated. Alternatively, the size of the gap can be increased to provide a spacing of such size that no material visco-elastic effect is obtained, i.e. the gap is increased to a size greater than that critical size normally necessary for visco-elastic operability.

When a device is operated with the first, above-defined gap condition in effect, the apparatus of the present invention functions as a centripetal extruder and material issues from the outlet orifice.

When the second condition obtains, there is either (1) insufficient pressure developed at the enlarged gap to cause the issuance of material through the orifice or (2) insufficient visco-elastic effect for operability and, although rotation continues and all other operating conditions remain the same, no extrudate issues. To re-initiate effective extrusion, it is only necessary to re-establish the initial gap condition.

Therefore, it will be seen that the present invention provides an effective intermittently operating centripetal or elastic melt extruder.

It is, therefore, an important object of the present invention to provide a new and novel elastic melt extruder capable of intermittent issuance of extrudate by varying the size of the shearing gap.

Another important object of the present invention is the provision of an elastic melt extruder wherein a variable shearing gap is provided between relatively rotatable shearing elements to vary the issuance of extrudate.

It is a further important object of the present invention to provide a new and improved method of operating an elastic melt extruder wherein a pair of relatively rotatable shearing elements are relatively separable to vary a shearing gap defined therebetween from a first dimension at which extrudate is issued through a reduced orifice to a second dimension at which no extrudate is issued.

It is a further, and no less important, object of the present invention to provide an elastic melt extruder having relatively rotatable shearing elements provided with confronting radial faces defining a gap therebetween communicating with a restricted outlet orifice, the elements also being relatively axially displaceable to vary the gap to an extent such that the issuance of extrudate through the orifice can be interrupted without halting the extruder.

Other objects of this invention will appear in the following description and appended claims, reference being had to the accompanying drawings forming a part of this specification wherein like reference characters designate corresponding parts in the several views.

On the drawings:
FIGURE 1 is a plan view of an elastic melt extruder of the present invention effective to issue extrudate;
FIGURE 2 is a side elevational view, with parts broken away and in section, of the extruder of FIGURE 1;
FIGURE 3 is a view similar to FIGURE 2, but illustrating an adjusted position of the extruder;
FIGURE 4 is a view similar to FIGURE 3 but illustrating the adjusted position of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in the drawings:

In FIGURE 1, reference numeral 10 refers generally to an elastic melt extruder of the present invention. The extruder 10 comprises an outer casing or housing composed of axially spaced front and rear plates 11, 12 joined by a peripheral, cylindrical wall 13 to enclose a cylindrical interior chamber 14.

The interior surface 15 of the front wall 11 provides a fixed shearing face for the shearing gap, as will be hereafter described in greater detail. The front wall 11 is provided with a central aperture 16 communicating with an extrudate outlet conduit 17, the aperture 16 forming the outlet orifice for the shearing gap, as will be hereafter more fully described. Mounted on the upper exterior surface of the peripheral wall 13 is a material hopper 18 for containing particulate thermoplastic material communicating through a hopper aperture 19 with the interior space 14.

Disposed within the space 14 is a rotatable disc indicated generally at 20, this disc being circular in peripheral configuration and having a planar forward face 21 cooperating with the interior face 15 of the wall 11 to provide therebetween a shearing gap 22. The rotatable disc 20 fits snugly within the chamber 14 in close running peripheral fit to the interior cylindrical wall 23 of the peripheral wall 13. The disc 20 is driven by means of an axially readwardly projecting drive shaft 25 extending through an aperture 26 in the rear casing wall 12 to be journalled therein. Of course, suitable anti-friction bearings (not shown) can be provided to support the shaft 25 in the wall 12.

The rear end of the shaft 25 is provided with axially elongated peripheral splines 27 splined into a surrounding spur gear 28, the shaft 25 being axially shiftable relative to the gear 28 without interrupting rotation of the shaft 25 with the gear 28. The spur gear 28 meshingly engages a second, driving spur gear 29 fixed to a drive shaft 30, which is driven by a suitable means, as by an electric motor or the like. Of course, the gears 28, 29 and the shaft 30 are disposed within and axially retained by a surrounding gear case (not shown for clarity of illustration).

The shaft 25 is provided with an axially rearwardly projecting stub end 31 contacted by the free lower end of the lever 32 pivotal about a central pivot point 33 carried by a bifurcated clevis or the like 34 fixed to a supporting member schematically illustrated at 35. The free upper end of the lever 32 is pivoted, as at 36, to the bifurcated end of the actuating rod 37 of a fluid pressure actuated cylinder 38 adapted to receive fluid under pressure from a source (not shown) through conduits 39.

As will be readily appreciated by a comparison of FIGURES 1 and 2 with FIGURES 3 and 4, actuation of the cylinder 38 to extend the piston rod 37 thereof will pivot the lever 32 in a counterclockwise direction about the pivot pin 33 to displace the shaft 25 abutted by the free end of the lever to its position of FIGURE 1. At this adjusted position, the relatively rotatable faces 15, 21 of the elements 11, 20 are spaced through a gap 22 which is of a dimension (preferably less than ½ of an inch), at which an effective shearing gap 22 is provided. Material from the supply hopper 18 entering the gap 22 will be sheared therein, and the visco-elastic effect will result in the extrusion of plasticized material through the orifice 16 and the extrusion nozzle 17.

When operating in this manner, the apparatus 10 functions as a conventional elastic melt extruder. Of course, the issuance of the plasticized material through the orifice 16 is premised upon the fact that the pressure exerted on the material in the gap 22 exceeds the pressure necessary to extrude the material through the orifice 16.

When the cylinder 38 is actuated to its position of FIGURE 3, at which the piston rod 37 is retracted and the lever 32 is pivoted in a clockwise direction, the pressure within the gap 22 will separate the faces 15 and 21 to an extent such that the gap 22 becomes enlarged and the pressures generated in the enlarged gap 22a (FIGURE 3) are less than the pressures required to issue extrudate through the orifice 16. Alternatively, the gap 22a may be more than the critical gap necessary to any visco-elastic shearing between the faces 15, 21. Thus, even though the disc 20 continues to be rotated and even though the degree of relative rotation between the faces 15 and 21 remains the same, there will be no issuance of extrudate through the orifice 16.

The forces urging the faces 15, 21 from their effective position of FIGURE 1 to their more widely spaced ineffective position of FIGURE 3 is the force generated at the gap 22, 22a. Even wheen the faces are separated as to the extent illustrated in FIGURES 3 and 4, the pressure generated is sufficient to urge the faces apart. The degree of separation of the faces is dependent upon the size of the orifice 16 (or the pressure drop at the orifice) which sets the minimum requirement of pressure required for actual issuance of material. The snug fit of the rotating disc 20 within the chamber 14 prevents any effective by-passing of material between the peripheral wall 23 of the chamber and the exterior periphery of the disc 20.

Thus, it will be seen that the present invention provides an intermittently operable elastic melt extruder capable of broad uilization in plastic fabricating operations, such as injection molding, blow molding or the like in which the issuance of plasticized material is required during only a portion of the molding cycle.

I claim:

1. In an elastic melt extruder, a driven element and a fixed element having spaced confronting faces, enclosure means defining an interior space snugly peripherally enclosing said faces and having a peripheral inlet opening through which particulate material is supplied to the space between said faces and an axial outlet opening in one of the faces for extrudate, means supporting one of said elements for movement axially of said faces to vary the spacing of said faces between a first closely spaced position at which said faces are effective to exert a visco-elastic effect upon material introduced through said inlet so that the material is melted and issued under pressure through said outlet opening, and a second relatively further spaced position at which said faces are ineffective to exert a visco-elastic effect on said material and material is merely accumulated between said faces, and means for moving said one of said elements between said first and second positions.

2. In a method of extruding a thermoplastic material by the visco-elastic effect exerted between the confronting faces of relatively rotatable elements, the steps of positioning said faces at a distance effective to provide a visco-elastic shearing gap therebetween whenever the issuance of extrudate is desired, and spacing said faces through a distance greater than that necessary to form an effective visco-elastic shearing gap whenever the issuance of extrudate is not desired.

3. In an elastic melt extruder, a casing defining a cylindrical interior chamber intermediate a pair of circular end walls, one of said walls defining a fixed shearing face and having a central outlet opening therein, means for supplying particulate thermoplastic material to the periphery of said chamber in substantial radial alignment with said face, a rotatable shearing disc disposed in said chamber to be snugly peripherally enclosed therein and having a radial face confronting the shearing face of said chamber, said disc being of an axial extent substantially less than the axial extent of said chamber, means supporting said disc for axial displacement in said chamber toward and away from the shearing face thereof to vary the gap between the shearing face of the disc and the shearing face of the chamber, means for rotating said disc, and power means for axially displacing said disc during rotation.

4. In an elastic melt extruder, a casing defining a cylindrical interior chamber having a circular end wall defining a fixed shearing face provided with a central outlet opening therein, a rotatable shearing disc disposed in said chamber, said disc having an axial extent substantially less than that of said chamber and having a peripheral surface snugly peripherally enclosed therein, said disc having a radial face confronting the shearing face of said chamber, means supporting said disc for axial displacement in said chamber toward and away from the shearing face thereof to vary the gap between the shearing face of the disc and the shearing face of the chamber between a first position at which an effective visco-elastic shearing gap is provided and a second position at which no such effective gap is provided, means for rotating said disc, and means for axially displacing said disc without regard to any rotation thereof.

5. In a method of intermittently extruding a thermoplastic material by the visco-elastic effect exerted between the confronting faces of a pair of relatively rotatable elements defining therebetween a shearing gap, the steps of issuing extrudate from the center of said gap by positioning said faces at a first distance effective to exert a visco-elastic effect on material in the gap and interrupting the issuance of extrudate by separating the faces at a second greater distance ineffective to exert a visco-elastic effect on material in the gap.

6. In an elastic melt extruder, a casing having an interior cylindrical chamber snugly peripherally enclosing a rotatable element, said rotatable element and one end wall of said chamber having spaced confronting faces, said chamber having a peripheral inlet opening through which particulate material is supplied to the space between said faces and said one end wall having an axial outlet opening for extrudate, means supporting said rotatable element for movement in said chamber axially relative to said end wall, means for shifting said rotatable element to a first position at which said faces are sufficiently closely spaced to exert a visco-elastic effect upon material introduced through said inlet so that the material is melted and issued under pressure through said outlet opening, and to a second position at which said faces are relatively further spaced so as to be ineffective to exert a visco-elastic effect on said material and material is merely accumulated between said faces and means for rotating said rotatable element at both of its said positions.

7. In an elastic melt extruder, a pair of relatively rotatable elements including a driven element and a fixed element having spaced confronting faces, enclosure means defining an interior space snugly peripherally enclosing said faces and having an inlet opening through which particulate material is supplied to the space between said faces and an axial outlet opening in one of the faces for extrudate, means for relatively rotating said elements, means supporting one of said elements for movement axially of said faces, and power means for moving said one of said elements regardless of any relative rotation thereof to vary the spacing of said faces between (1) a first closely spaced position at which said faces are effective to melt and extrude material under pressure through said outlet opening, and a second relatively further spaced position at which said faces are ineffective to extrude said material and the material is merely accumulated between said faces.

References Cited by the Examiner

UNITED STATES PATENTS

| 2,629,132 | 2/1953 | Willcox et al. | |
| 2,977,632 | 4/1961 | Bunch | 18—12 X |
| 3,032,814 | 5/1962 | Miner | 18—12 |
| 3,082,476 | 3/1063 | Bunch | 18—12 |
| 3,123,861 | 3/1964 | Westover | 18—12 |

OTHER REFERENCES

Modern Plastics: October 1959, pp. 107–109, 112, 114, 202, 204, 208 and 210.

S.P.E. Journal, April 1965, pp. 391–395.

WILLIAM J. STEPHENSON, *Primary Examiner.*